United States Patent Office 3,436,993
Patented Apr. 8, 1969

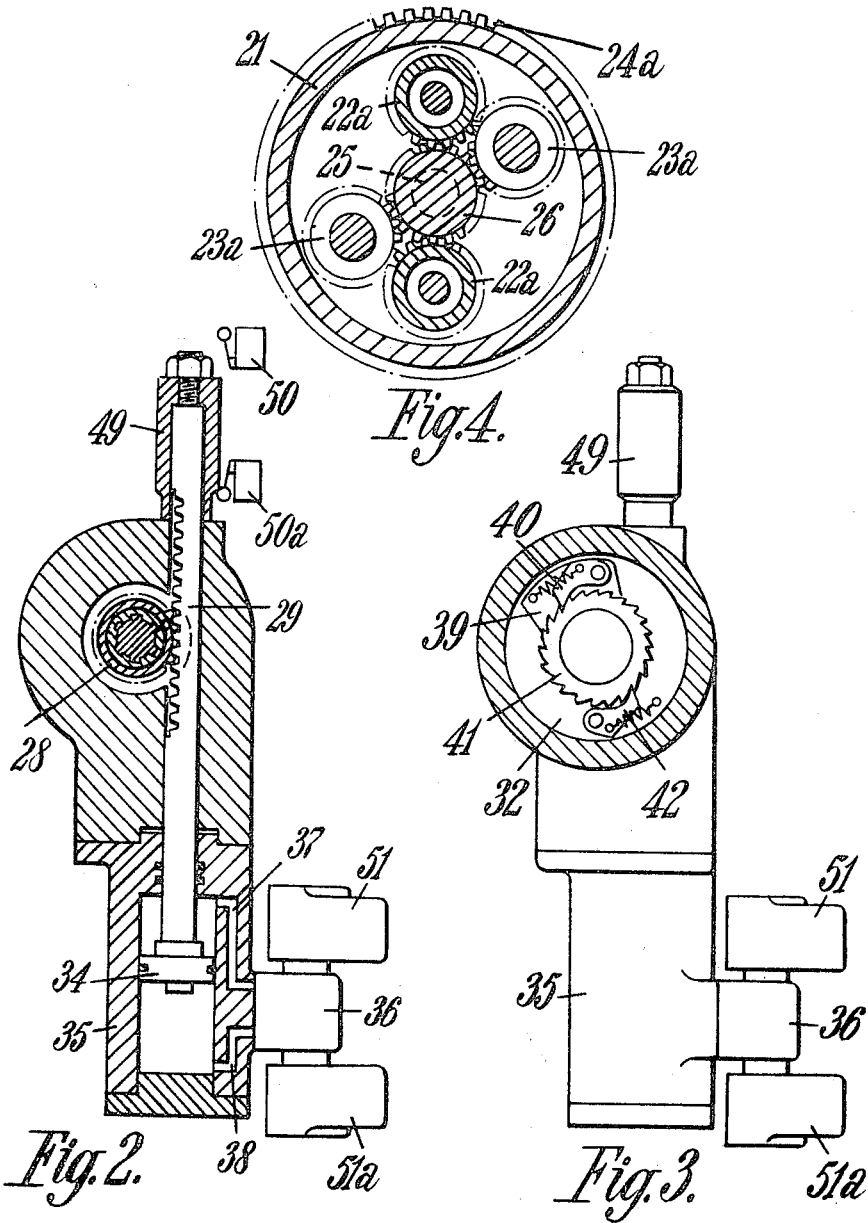

3,436,993
SCREW CUTTING LATHES AND OTHER SCREW CUTTING MACHINES
Albert Lucie, Johnstone, Scotland, assignor to Wickman Lang Limited, Johnstone, Scotland, a British company
Filed Apr. 15, 1966, Ser. No. 542,796
Int. Cl. B23b 1/12, 21/00, 1/00
U.S. Cl. 82—5
4 Claims

ABSTRACT OF THE DISCLOSURE

The invention consists in a lathe for cutting multiple threads and consists in providing a differential gear introduced between the work spindle which carries the chuck and the variable speed gear by which the lead screw is rotated, the rotation of the lead screw traversing the carriage carrying the cutting tool, one member of the differential gear being driven by the work spindle, another member thereof driving the lead screw and the third member thereof, which is normally stationary, having means by which it can be given a partial rotary movement to index the workpiece relative to the cutting tool.

---

Figure 1:
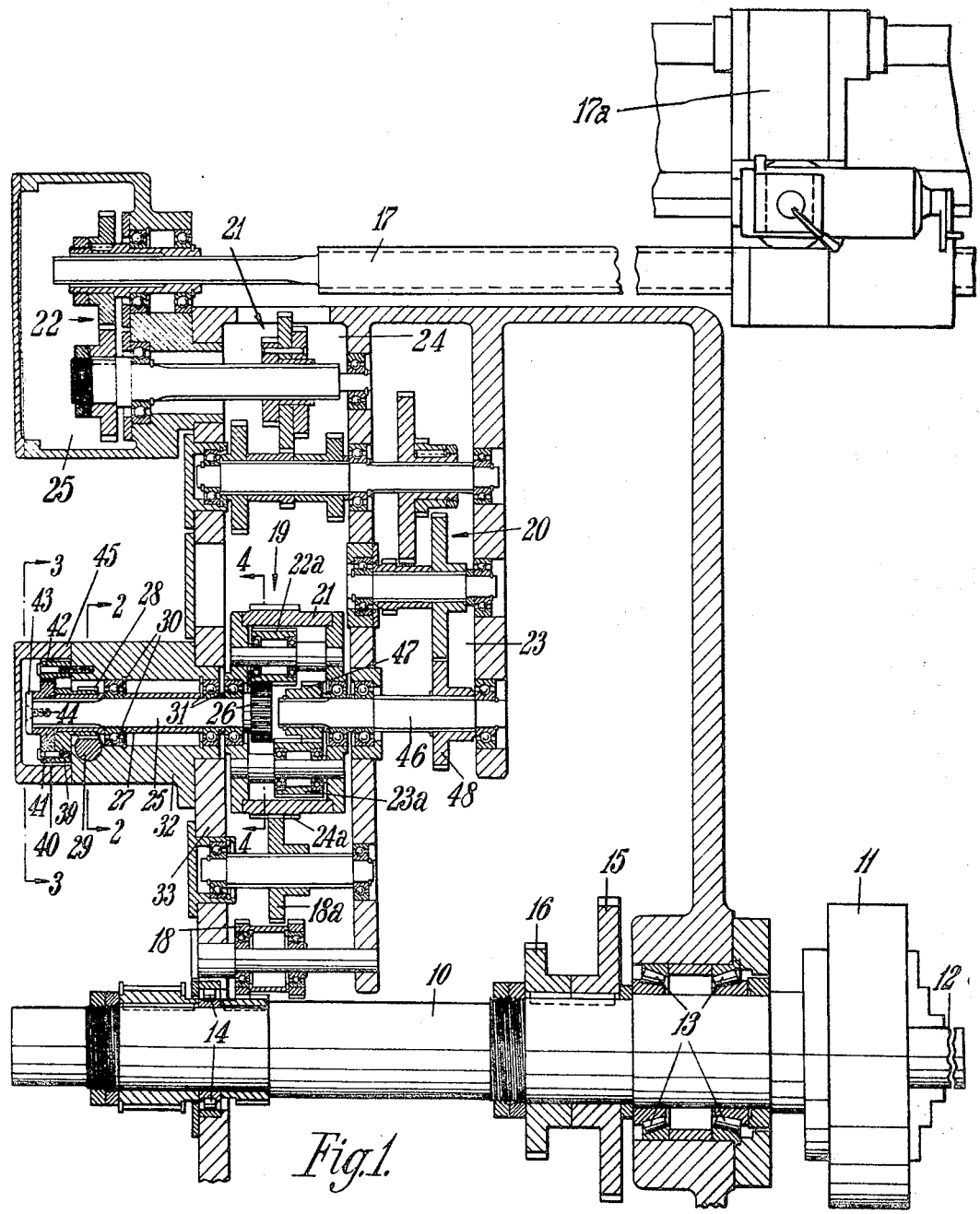

This invention has reference to screw cutting lathes for cutting multi-start screws. Such machines are provided with a work spindle by which the workpiece is rotated, a lead screw by which a saddle carrying the cutting tool is traversed relative to the workpiece and a variable gear introduced between the work spindle and the lead screw the work spindle driving the lead screw through the variable gear.

When cutting multi-start screws it is necessary to impart to the workpiece a partial rotary movement after each cut has been made, the extent of the rotary movement depending on the number of starts to be cut and is such that the workpiece is properly indexed with respect to the cutting tool at the commencement of each cut. Thus if there are two starts the workpiece must be rotated 180° to index it correctly for the next cut, if there are four starts it must be rotated 90° and so on.

The present invention has for its object to provide improvements in screw cutting machines whereby the workpiece can be easily, quickly and correctly indexed while the machine is running prior to making each cut.

According to the present invention a screw cutting machine for cutting multiple threads is provided with a differential gear introduced between the work spindle and the variable gear by which the lead screw is rotated to traverse the cutting tool, one member of the differential gear being driven by the work spindle, another member thereof, running at the same speed as the work spindle, driving the gear by which the lead screw is rotated and the third member thereof, which is normally held stationary, having means by which it can be given a partial rotary movement to index the workpiece relative to the cutting tool preparatory to making the next cut.

In preference the cage of the differential gear which carries the planetary wheels is driven by the work spindle, one of two aligned shafts of the differential gear drives the gear in the gear box and the other shaft, which is normally held stationary, has means by which it can be given the partial rotary movement.

The said other shaft may be given a partial rotation by means of rack and pinion mechanism, the rack being reciprocated either manually or by power to effect the indexing of the workpiece.

Thus the rack may be reciprocated by a hydraulic piston and cylinder assembly to which hydraulic fluid is supplied under pressure under the control of valve means operated either manually or automatically.

A preferred embodiment of the invention will now be described with reference to the accompanying drawings wherein:

FIGURE 1 is a sectional layout of a multi-start screw cutting lathe in accordance with the invention, only such parts thereof as are necessary for the understanding of the invention being shown; and FIGURES 2, 3 and 4 are sections on the lines 2—2, 3—3 and 4—4 of FIGURE 1 respectively.

In the drawings 10 denotes the main spindle of the lathe which spindle carries the chuck 11 by which the workpiece 12 is held. The tail stock is not shown. The main spindle is journalled in bearings 13 and 14 and is driven by a motor through conventional gearing, only the final driven gear wheels 15 and 16 being shown.

The lead screw 17 of the lathe drives the tool carriage 17a through a nut, the nut being shown. As FIGURE 2 is a layout view the chuck and the carriage are now shown in their true relative positions. The main spindle 10 drives the lead screw 17 through a conventional reversing gear 18 for right and left hand screws, through a differential gear 19 and through conventional trains of gear wheels 20, 21 and 22 in gear casings 23, 24 and 25 respectively, said trains of gear wheels being provided for varying the pitch of the thread to be cut.

The differential gear 19, which is provided to index the workpiece prior to each succeeding cut and is introduced between the reversing gear 18 and the train of gear wheels 20, is of the epicycle type and embodies a cage 21a which carries planetary wheels 22a and 23a. The cage is provided with external teeth 24a which mesh with the driven gear wheel 18a of the reversing gear 18.

One of the aligned shafts 25 of the differential gear carries at one end thereof the sun wheel 26 of the differential gear, the sun wheel meshing with the planetary wheels 22a, and at the other end thereof has loose thereon a bush 27 which has integral therewith or has secured thereto a pinion wheel 28 which meshes with a rack 29. The shaft 25 is journalled in bearings 30 and 31 within a housing 32 which at its inner end is supported by a wall 33 of the lathe. The rack 29 can be reciprocated to rotate the pinion wheel 28 by means of a piston 34 which work in a cylinder 35 secured to the housing 32. By means of a valve 36 hydraulic fluid under pressure can be admitted through passages 37 and 38 to act on each side of the piston alternately and thereby reciprocate the piston and rack.

The bush 27 has a laterally extending lug 39 which carries a spring biased pawl 40 which engages a ratchet wheel 41 fast on the said shaft 25. Also engaging the ratchet wheel is a second spring biased pawl 42 pivoted to the outer end of the housing 32, this pawl preventing the rotation of the ratchet wheel in one direction, i.e., it takes the reaction of the shaft 25. The ratchet wheel is removable and is secured to the end of the shaft 25 by means of a disc 43 and a screw 44 screwed into a tapped hole in the end of the shaft 25. The ratchet wheel and pawls are housing in a casing 45 on the outer end of the housing 32.

The other axially aligned shaft 46 of the differential gear has fast on its inner end a pinion or sun wheel 47 with which mesh the planetary gear wheels 23a carried by the cage. Also on said other shaft is a gear wheel 48 which drives the gearing 20. It will be noted that two planetary gear wheels 22a mesh with the sun wheel 26, that two planetary gear wheels 23a mesh with the wheel 47 and, as shown in FIGURE 4, each planetary wheel 22a meshes with a planetary gear wheel 23a.

The aforesaid differential gearing is such that its driven shaft is rotated at the same speed as the work spindle.

The number of teeth in the ratchet wheel 41 must be such that it will be possible to impart the desired rotary indexing movement relative to the second shaft and this movement may be regulated or adjusted by any suitable means, for example by a collar 49 secured to the outer end of the rack, which collar at the end of its upward travel, as viewed in FIGURE 2, closes a switch 50 which results in a solenoid 51 being energised, the solenoid when energised operating the valve to reverse the travel of the rack.

If there are, say, 24 teeth in the ratchet wheel the work spindle may be indexed to give 2, 3, 4, 6, 8, 12 or 24 starts and the travel of the rack must be adjusted accordingly. By using collars of varying lengths the travel of the rack can be regulated to suit the desired rotary movement to be imparted to the ratchet wheel and shaft. By using ratchet wheels having other numbers of teeth the work spindle can be indexed to give other combinations of starts.

A second solenoid 51a is provided to actuate the valve 36 this solenoid being energised by the closing of a switch either manually or automatically and when energised moving the valve so that pressure fluid is admitted below the piston.

A further switch 50a is closed by the collar 49 at the end of the indexing stroke this constituting an interlock by which the cutting tool is prevented from approaching the workpiece before the indexing of the workpiece is completed.

Normally the piston 34 is at the foot of its cylinder as viewed in FIGURE 2. Prior to commencing a new cut the solenoid 51a is energised, this being done manually by closing a micro-switch. This solenoid, when energised, operates the valve 36 to admit pressure fluid below the piston which is thereby displaced, the ratchet wheel then rotating idly.

At the end of the idle stroke the collar 49 closes the switch 50 which results in solenoid 51 being energised and the valve 36 actuated to admit pressure fluid to the other side of the piston which then effects its working stroke. That is the rack rotates the bush 27 and the bush, through the pawl 40, imparts a partial rotary movement to the first shaft 25 of the differential gear and this in turn results in a partial rotary movement being given to the other shaft 46 to correctly index the workpiece relative to the cutting tool for the next start.

It will be appreciated that the extent of the partial rotary movement is determined by length of the collar 49. The longer the collar the shorter the idle stroke before it closes the switch 50 and the shorter the idle stroke the shorter is the following working stroke with consequent corresponding short partial rotary movement.

When the indexing movement is completed switch 50a is closed and then the tool can approach the workpiece preparatory to making the next cut.

The above described cycle of operations is repeated preparatory to making each cut.

It will be understood that various constructions of differential gears may be used and any other means used for rotating the first shaft.

What I claim is:

1. A multi-start screw cutting machine having a main spindle with chuck for rotating a workpiece, a saddle with cross slide for carrying a cutting tool to cut a thread in the workpiece, a lead screw by which the saddle is traversed, variable gearing by which the main spindle and lead screw are rotated at a selected predetermined relative speed ratio and a differential gear introduced between the work spindle and said variable gear, one member of the differential gear being driven by the work spindle, another member thereof running at the same speed as the work spindle driving the gear by which the lead screw is rotated and the third member thereof, which is normally held stationary, having means by which it can be given a partial rotary movement to index the workpiece realtive to the cutting tool after making one cut and prior to making the next cut.

2. A screw cutting machine as claimed in claim 1 wherein the differential gear is of the epicyclic type and in which the cage of the differential gear which carries the planetary wheels is driven by the work spindle, one of two aligned shafts of the differential gear drives the gear by which the lead screw is driven and the other shaft, which is normally held stationary, has means by which it can be given a partial rotary movement.

3. A screw cutting machine as claimed in claim 2 having rack and pinion mechanism by which said other shaft is given a partial rotation to effect indexing of the workpiece.

4. A screw cutting machine as claimed in claim 3 having a hydraulic piston and cylinder assembly by which the rack is reciprocated.

References Cited

UNITED STATES PATENTS

| | | | |
|---|---|---|---|
| 536,615 | 4/1895 | Flather | 82—26 |
| 844,831 | 2/1907 | Smith | 82—5 |
| 1,200,703 | 10/1916 | Bolkovac | 82—5 |
| 2,926,366 | 1/1960 | Mannaioni | 82—5 |

HARRISON L. HINSON, *Primary Examiner.*

U.S. Cl. X.R.

82—26